US007920935B2

(12) United States Patent
Knipfer et al.

(10) Patent No.: US 7,920,935 B2
(45) Date of Patent: Apr. 5, 2011

(54) ACTIVITY BASED REAL-TIME PRODUCTION INSTRUCTION ADAPTATION

(75) Inventors: Ivory Wellman Knipfer, Rochester, MN (US); Eng Hin Koh, Singapore (SG); Ser Huay Tan, Singapore (SG); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/194,274

(22) Filed: Aug. 19, 2008

(65) Prior Publication Data

US 2010/0332008 A1    Dec. 30, 2010

(51) Int. Cl.
*G06F 19/00*    (2006.01)
(52) U.S. Cl. ........................................ 700/111; 700/108
(58) Field of Classification Search .................. 700/108, 700/111
See application file for complete search history.

(56) References Cited

U.S. PATENT DOCUMENTS

| | | | |
|---|---|---|---|
| 4,671,772 A | 6/1987 | Slade et al. | |
| 4,701,847 A | 10/1987 | Nichols | |
| 4,783,738 A | 11/1988 | Li et al. | |
| 4,827,423 A * | 5/1989 | Beasley et al. | 700/96 |
| 5,539,650 A * | 7/1996 | Hehl | 700/200 |
| 5,643,212 A | 7/1997 | Coutre et al. | |
| 5,799,292 A | 8/1998 | Hekmatpour | |
| 5,877,961 A * | 3/1999 | Moore | 700/180 |
| 6,033,226 A | 3/2000 | Bullen | |
| 6,052,676 A | 4/2000 | Hekmatpour | |
| 6,169,733 B1 | 1/2001 | Lee | |
| 6,206,700 B1 | 3/2001 | Brown et al. | |
| 6,224,385 B1 * | 5/2001 | Nitta et al. | 434/219 |
| 6,247,126 B1 | 6/2001 | Beelitz et al. | |
| 6,345,207 B1 * | 2/2002 | Nitta et al. | 700/83 |
| 6,347,303 B2 | 2/2002 | Nagai et al. | |
| 6,539,269 B1 | 3/2003 | Jarrow et al. | |
| 6,589,055 B2 * | 7/2003 | Osborne et al. | 434/219 |
| 6,606,480 B1 | 8/2003 | L'Allier et al. | |
| 7,039,620 B2 | 5/2006 | Uegaki | |
| 7,039,632 B2 * | 5/2006 | McCormick | 1/1 |
| 7,072,733 B2 | 7/2006 | Magee et al. | |
| 7,103,506 B2 | 9/2006 | Friedrich et al. | |
| 7,153,140 B2 * | 12/2006 | Ivanir et al. | 434/322 |
| 7,590,942 B2 * | 9/2009 | Phillips et al. | 715/763 |

(Continued)

OTHER PUBLICATIONS

"An Operator Experience With a Hierarchical Real-time control system (RCS)", Huang et al, National Institute of Standards and Technology, 1996.*

(Continued)

*Primary Examiner* — Michael D Masinick
(74) *Attorney, Agent, or Firm* — Yee & Associates, P.C.; Steven L. Bennett

(57) ABSTRACT

A manufacturing process for automatically delivering an appropriate level of instructions to a manufacturing operator on demand based on the manufacturing operator's level of activity and performance, the particular characteristics of the product being manufactured, and the particular production environment. Responsive to receiving an order for a product, the manufacturing process identifies an authorization level assigned to an operator performing a particular manufacturing activity on a part in the product and assigns a default level of instructions to the operator based on the authorization level. The process collects and models characteristics about the manufacturing environment, performance history of the operator, and knowledge decay of the operator to determine an appropriate level of instructions to provide to the operator performing a particular manufacturing activity. The manufacturing instructions associated with the appropriate level of instructions are then provided to the operator.

20 Claims, 13 Drawing Sheets

U.S. PATENT DOCUMENTS

| | | | |
|---|---|---|---|
| 7,672,737 B2 * | 3/2010 | Hood et al. | ............... 700/1 |
| 2002/0191002 A1 | 12/2002 | Friedrich et al. | |
| 2003/0139840 A1 | 7/2003 | Magee et al. | |
| 2004/0002918 A1 | 1/2004 | McCarthy et al. | |
| 2004/0230951 A1 | 11/2004 | Scandura | |
| 2005/0026131 A1 | 2/2005 | Elzinga et al. | |
| 2005/0186550 A1 | 8/2005 | Gillani | |
| 2006/0101441 A1 | 5/2006 | Fulton et al. | |
| 2006/0129516 A1 | 6/2006 | Bradford et al. | |
| 2006/0166626 A1 | 7/2006 | Luo et al. | |
| 2007/0124625 A1 | 5/2007 | Hassan et al. | |
| 2010/0028846 A1 * | 2/2010 | Cohen et al. | ............... 434/323 |

OTHER PUBLICATIONS

"Establishing Information Requirements for Supervisory Controllers in a Flexible Manufacturing System using GTA", Usher et al, Human Factors and Ergonomics in Manufacturing, vol. 10, 2000.*

* cited by examiner

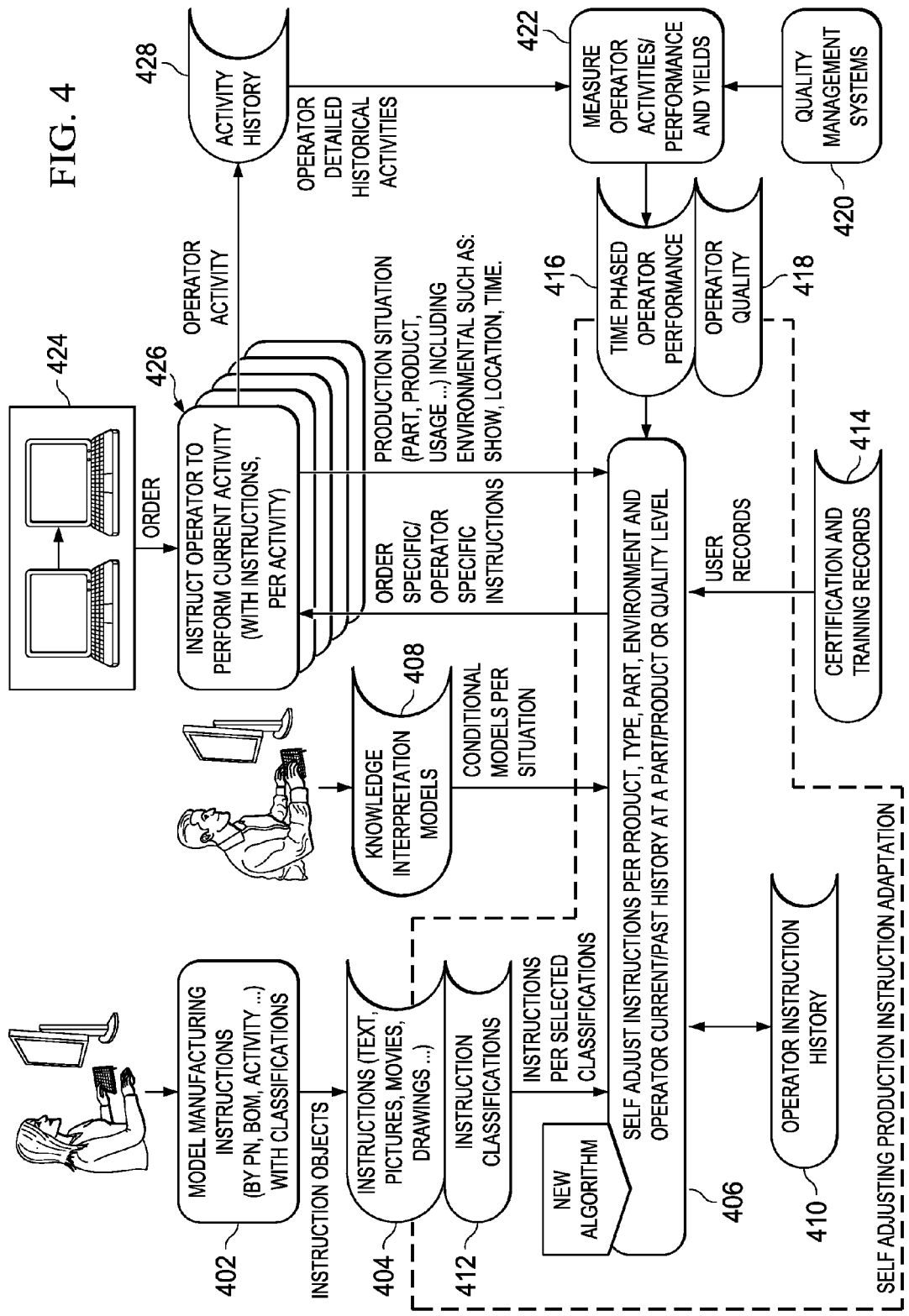

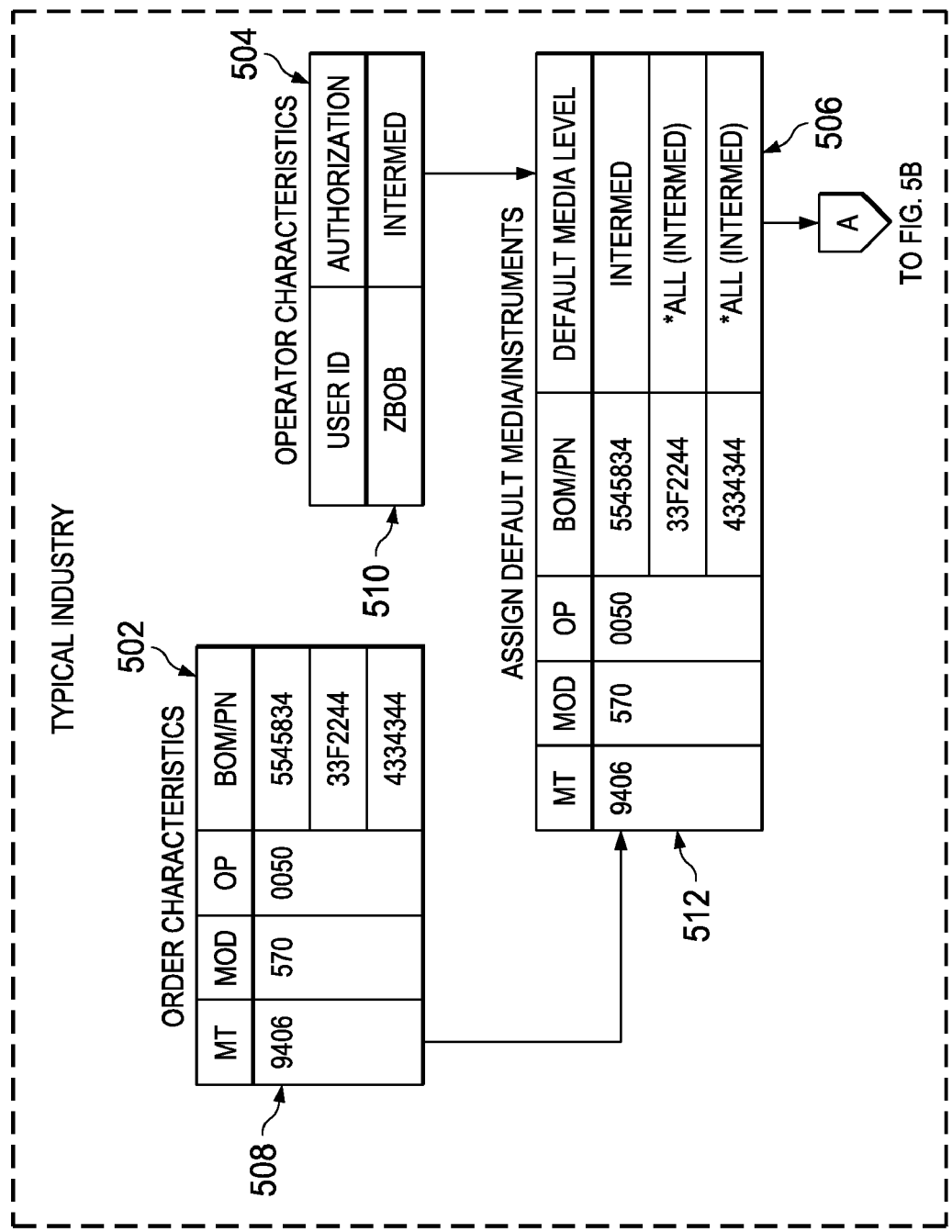

| PRODUCT KEY | | PLANT | AREA | SHIFT | TIME WINDOW | OVERRIDE LEVEL | ADJUST ALLOWED |
|---|---|---|---|---|---|---|---|
| MT | MOD | | | | | | |
| 9406 | 570 | 1 | KIT | 2,3 | EOQ - 5 DAYS | NOVICE | UP |
| | | 2 | KIT | 2 | EOQ - 5 DAYS | NOVICE | DOWN |
| *ALL | *ALL | *ALL | *ALL | 2,3 | *ALL | *ACTUAL | ALL |

FIG. 6

| PRODUCT KEY | | | CYCLE TIME | | | DEFECT RATE | OVERRIDE LEVEL |
|---|---|---|---|---|---|---|---|
| MT | MOD | OPERATING NUMBER | CYCLE TIME | TIMES PERFORMANCE | TIME PERIOD | ERROR RATE (OR QTY) | |
| 9406 | 570 | | | | *NONE | 1% - 3% | INTERMED |
| 9406 | *ALL | 0050 | 16-20 MINUTES | >20 | 2 WEEKS | | *HIDE |
| *ALL | 550 | 0010 | < 5 MINUTES | *ALL | *ALL | | EXPERT |

FIG. 7

| PRODUCT KEY | | | SPECIAL CERT | KNOWLEDGE/DECAY | | OVERRIDE LEVEL |
|---|---|---|---|---|---|---|
| MT | MOD | BOM/PN | | TIMES PERFORMANCE | TIME PERIOD | |
| 9406 | 570 | *ALL | ESD | 100+ | 4 WEEKS | *HIDE |
| | | | | 50 - 99 | 4 WEEKS | EXPERT |
| | | | | 11 - 50 | 4 WEEKS | INTERMED |
| | | | | < 10 | 2 WEEKS | NOVICE |
| 9406 | 570 | 33F2244 | | > 50 | 1 WEEK | *HIDE |

FIG. 8

| CONTROL NUMBER | MACHINE TYPE | MODEL | OPERATION | USER ID | BOM | MEDIA |
|---|---|---|---|---|---|---|
| 1WING01 | 9406 | 520 | 0050 | UDAKING | 11D1111 | A <MEDIA> |
| 1WING01 | 9406 | 520 | 0050 | UDAKING | 22A2222 | B <MEDIA> |
| 1WING01 | 9406 | 520 | 0050 | UDAKING | 33W3333 | C <MEDIA> |
| 1WING01 | 9406 | 520 | 0050 | UDAKING | 44G4444 | D <MEDIA> |

| PRODUCT KEY | | | INSTRUCTION OR MEDIA | LEVEL OF INSTUCTION |
|---|---|---|---|---|
| MT | MOD | BOM OR PN | | |
| 9406 | 570 | 5545834 | A- <MEDIA FILE, URL LINK OR INSTRUCTION> | NOVICE |
| | | | B- <MEDIA FILE, URL LINK OR INSTRUCTION> | INTERMED |
| | | | C- <MEDIA FILE, URL LINK OR INSTRUCTION> | EXPERT |
| *ALL | *ALL | 33F2244 | L- <MEDIA FILE, URL LINK OR INSTRUCTION> | *ALL |
| *ALL | *ALL | 4334344 | P- <MEDIA FILE, URL LINK OR INSTRUCTION> | *ALL |
| | | | Q- <MEDIA FILE, URL LINK OR INSTRUCTION> | EXPERT |

1002 points to row with 9406/570/5545834

| USER ID | MT | MOD | OP | QUALIFICATION/AUTHORIZATION | CERTIFICATIONS |
|---|---|---|---|---|---|
| ZBOB | 9406 | 570 | 0050 | INTERMED | |
| ZBOB | *ALL | *ALL | *ALL | *ALL | ESD |

| CONTROL NUMBER | MACHINE TYPE | MODEL | OPERATION | USER ID | START TIMESTAMP | END TIMESTAMP |
|---|---|---|---|---|---|---|
| 1WING01 | 9406 | 520 | 0050 | UDAKING | 2007-12-11-07.00.00 | 2007-12-11-07.17.00 |
| 1WING02 | 9406 | 550 | 0050 | UDAKING | 2007-12-11-07.18.00 | 2007-12-11-07.40.00 |
| 1DDTWIN | 9406 | 570 | 0050 | UDAKING | 2007-12-11-07.41.00 | 2007-12-11-08.11.00 |
| 1DDVIKE | 9406 | 570 | 0060 | UDAKING | 2007-12-07-07.00.00 | 2007-12-07-08.42.00 |

| MACHINE TYPE | MODEL | OPERATION | USER ID | DEFECT RATE | FAILURE INSTANCES |
|---|---|---|---|---|---|
| 9406 | 520 | 0050 | UDAKING | 1.3% | 7 |
| 9406 | 550 | 0050 | UDAKING | 1.5% | 11 |
| 9406 | 570 | 0050 | UDAKING | 1.7% | 8 |
| 9406 | 570 | 0060 | UDAKING | 3.4% | 16 |

1302 points to first data row.

| LEVEL | RANK |
|---|---|
| *HIDE | 1 |
| EXPERT | 2 |
| INTERMED | 3 |
| NOVICE | 4 |
| *ALL | *NONE |
| *ACTUAL | *NONE |

1402 — *HIDE
1404 — EXPERT
1406 — INTERMED
1408 — NOVICE
1410 — *ALL
1412 — *ACTUAL

FIG. 14

ACTIVITY BASED REAL-TIME PRODUCTION INSTRUCTION ADAPTATION

BACKGROUND OF THE INVENTION

1. Field of the Invention

The present invention relates generally to an improved manufacturing process and in particular to providing instructions to manufacturing operators. More specifically, the present invention provides a manufacturing process that allows for automatically delivering an appropriate level of instructions to a manufacturing operator on demand based on the manufacturing operator's level of activity and performance, the particular characteristics of the product being manufactured, and the particular production environment.

2. Description of the Related Art

In a manufacturing environment, a requisition for goods or services, described in terms of exchange of those goods or services for agreed compensation in a contractual form, is called an order. Customers place orders for products that must be manufactured once the order has been placed. For timely manufacturing and delivery of the ordered product, a significant amount of planning, preparation, and procurement procedures are involved in the production process. Accounting systems, planning systems, warehouse management systems, logistics systems, and numerous other systems, support the production planning process to ensure that the orders are capable of being fulfilled. These systems may determine whether orders can be fulfilled based on the buyer's account status, suppliers' inventory levels, manufacturer's own warehouse inventory, quantities on hand, assembly schedule availability, and tooling and personnel availability among other factors.

When an order is received from a customer, the manufacturing system breaks down the order into requisite materials. The term "material" used in the context of an order in this manner means the various components, supplies, accessories, and consumable items needed for making the ordered product. For example, for an order for a computer, the materials may include a specific motherboard, a processor of a certain specification, a chassis of certain dimensions, a power supply of certain wattage, and number of screws of a certain size to fasten the motherboard to the chassis. For each order, the manufacturing system generates one or more bills of materials (BOM), which is a listing of materials needed to complete the order.

In some manufacturing environments, products are produced that have a high degree of variability or configurability. One common approach to manufacturing a configurable product is to manually lookup a placement and/or configuration of each component in paper-based or electronic tables. In addition to the tables, a set of static manufacturing instructions may be provided to the manufacturing operator to provide basic guidelines on how to assemble the product. Manufacturing instructions may be provided by a work instruction system that comprises an authoring tool and a viewing tool. A user inputs appropriate instructions into the system, which are subsequently communicated to the operator on the manufacturing line via the viewing tool. The operator uses these instructions to assemble the product according to the instructions. As the quality of the manufacturing instructions can have a significant impact on the quality and cycle time of the products being assembled, a good manufacturing instructions system will provide consistently up-to-date and easily understood instructions.

BRIEF SUMMARY OF THE INVENTION

The illustrative embodiments provide a manufacturing process that allows for automatically delivering an appropriate level of instructions to a manufacturing operator on demand based on the manufacturing operator's level of activity and performance, the particular characteristics of the product being manufactured, and the particular production environment. Responsive to receiving an order for a product, the manufacturing process identifies an authorization level assigned to an operator performing a particular manufacturing activity on a part in the product, and assigns a default level of instructions to the operator based on the authorization level. The process collects characteristics about the manufacturing environment, performance history of the operator, and knowledge decay of the operator. The process then models the characteristics about the manufacturing environment, performance history of the operator, and knowledge decay of the operator to determine an appropriate level of instructions to provide to the operator performing a particular manufacturing activity. The manufacturing instructions associated with the appropriate level of instructions are then provided to the operator.

BRIEF DESCRIPTION OF THE SEVERAL VIEWS OF THE DRAWINGS

FIG. 4 is a diagram of an exemplary adaptive instructions system in accordance with the illustrative embodiments;

FIGS. 5A and 5B illustrate exemplary data structures for implementing aspects of the illustrative embodiments;

FIG. 6 illustrates an exemplary data structure comprising environmental override criteria in accordance with the illustrative embodiments;

FIG. 7 illustrates an exemplary data structure comprising operator performance override criteria in accordance with the illustrative embodiments;

FIG. 8 illustrates an exemplary data structure comprising knowledge decay override criteria in accordance with the illustrative embodiments;

FIG. 9 illustrates an exemplary data structure comprising operator instruction history information in accordance with the illustrative embodiments;

FIG. 10 illustrates an exemplary data structure comprising instruction classifications in accordance with the illustrative embodiments;

FIG. 11 illustrates an exemplary data structure comprising operator certification levels in accordance with the illustrative embodiments;

FIG. 12 illustrates an exemplary data structure comprising time-phased operator performance information in accordance with the illustrative embodiments;

FIG. 13 illustrates an exemplary data structure comprising summarized operator quality information in accordance with the illustrative embodiments;

FIG. 14 illustrates an exemplary data structure comprising operator/instruction levels and rankings in accordance with the illustrative embodiments.

DETAILED DESCRIPTION OF THE INVENTION

Figure 1:
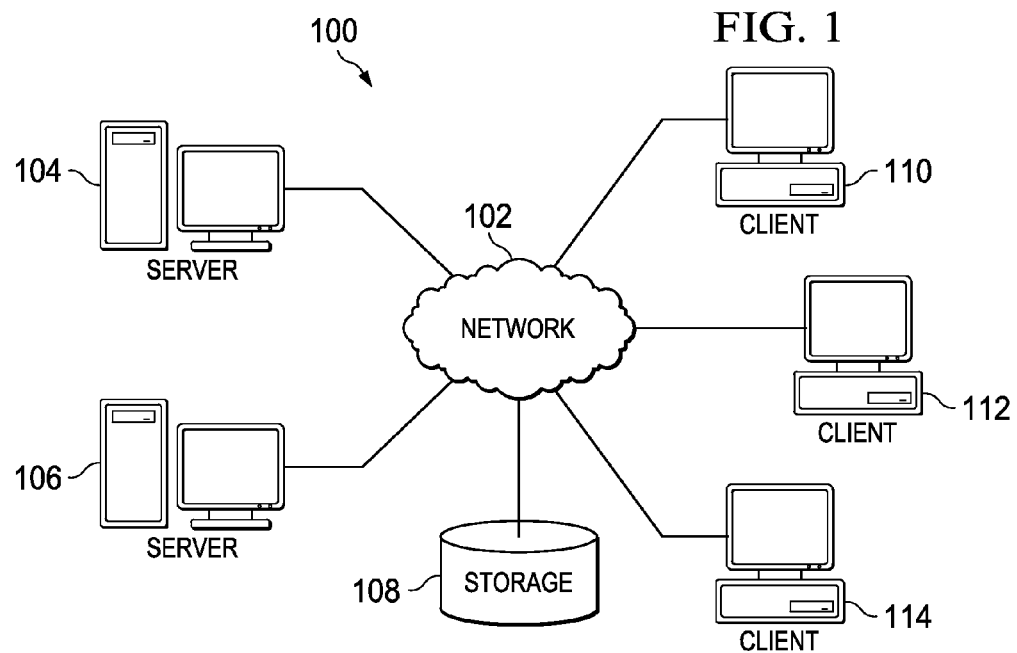
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
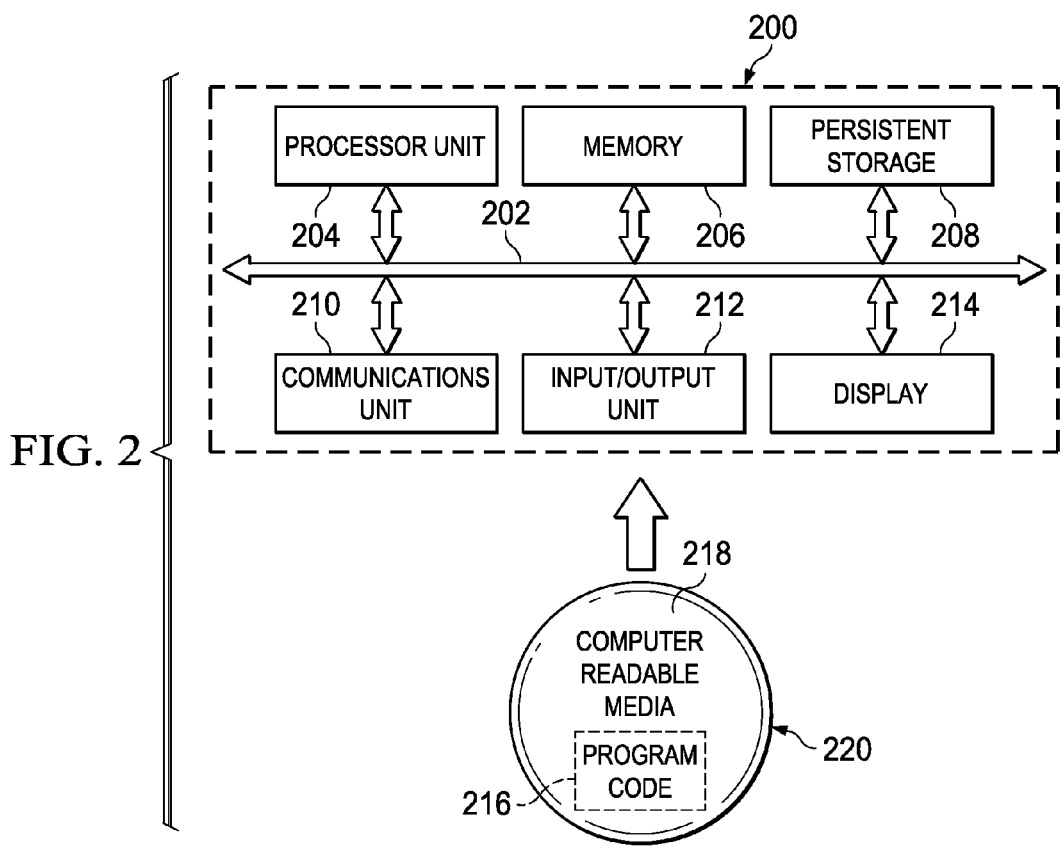
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, some manufacturers produce products that have a high degree of variability or configurability. Since each configurable product that "flows down the line" may be drastically different in terms of complexity, the operator skills required to produce each of these different products may vary on an order by order basis. When such a configurable product is produced, a set of static manufacturing instructions is often provided to the operators on the line to provide basic guidelines on how to assemble the configurable product. Manufacturing workforces of today are a collection of operators having widely-varying skill sets and capabilities. For instance, operators may comprise permanent and highly skilled individuals on one end and a short-term flexible contract set of individuals on the other end. This disparity in worker skill levels is increased when a global workforce comprising operators of low skill and limited education in many emerging countries are introduced in the manufacturing environment. Thus, an operator having a lower skill set will need additional manufacturing instructions to perform the task than an operator with a higher skill set. In addition, in an environment where an operator may perform multiple tasks on a daily basis, although the operator may be highly skilled/educated with regard to one task, the operator may still need additional manufacturing instructions to perform a second task because the operator does not perform the second task often. However, existing manufacturing environments do not allow for determining how to deliver the appropriate manufacturing instructions to an operator based on the particular order being processed on the line and based on the skills of the particular operator at a given point in the processing. Appropriate manufacturing instructions comprise instructions provided to an operator that will most likely provide the highest quality result in an acceptable amount of time (low cycle time) based on the particular operator performing the tasks and the operator's current skill level. The operator's skill level is reflective of the operator's past quality performance and lost abilities due to latency. Existing methods for providing manufacturing instructions to an operator may assign the same instruction level to an operator for assembling all parts in an order, regardless of that operator's actual skill levels in assembling each part in the product. A part is an individual component or device which exists prior to being assembled into another component or assembly. As appropriate instructions may not be provided to the operators on the line, a result is a rash of workmanship defects, negative cycle time impacts, serious training deficiencies, and even information overload for more experienced operators.

Examples of existing methods for providing manufacturing instructions to an operator comprise on-the-job training, on-line training or training manual, training workbenches, and providing maximum instructions. In a first example, on-the-job training comprises training the operator by having the operator work directly on the line assembling the product. A drawback to on-the-job training is that on-the-job training can be a time consuming process that interrupts production times for experienced operators who may be required to assist the operator in training. Also, on-the-job training is not scalable to high production environments and often yields inconsistent training results based on the individual training provided by each experienced operator. In a second example, on-line training or training manual processes are generally offline processes that also require long durations of training. On-line training processes are not tailored on an operator basis, nor are they generally tailored to accommodate all of a product's configurations or variations. In addition, on-line training processes do not offer the ability to deliver real-time direction as necessary in a complex environment. In a third example, training workbenches comprise physical simulation in a lab or test area that allows operators to obtain additional hands-on training. Although the training workbenches provide the benefit of simulating a real manufacturing environment, the training workbenches are offline processes that suffer the same limitations as the on-line training or training manuals processes. In a fourth example, maximum instruction processes always display the maximum work instructions to all operators for all situations. While these processes enable lower skilled operators to be trained on-line, providing all work instructions for assembling a product may slow high performing operators at the benefit of the lower skilled operators. Maximum instruction processes generally requires significant system performance and drives display clutter by providing information at times when such information is not needed by the operator.

The illustrative embodiments provide a solution to the problems above by providing an adaptive training system that allows for automatically delivering an appropriate level of instructions to a manufacturing operator on demand. The adaptive instruction system analyzes, in real-time, a manufacturing operator's product assembly activity and performance history, the particular characteristics of the product being assembled, and production environmental issues to automatically self-adjust (upgrade or downgrade) the level of instructions displayed to the operator at time of production tasks and activities. Examples of operator activity and performance may include, but are not limited to, the operator's error rate when assembling the particular product, the operator's frequency in assembling the particular product, the operator's average cycle time for the product, etc. Examples of product characteristics include, but are not limited to, the machine type, the model, the operation/activity, the part number or bill of materials, etc. Examples of product environments include, but are not limited to, the manufacturing plant, the manufacturing plant area, the operator shift, a time window for performing the activity or task, etc.

In one embodiment, the levels of instructions may be classified in the following manner: Novice level provides very basic (often the most) instructions; Intermediate level provides a balanced level of instructions between Expert and Novice; Expert level provides generally few instructions; and *Hide level allows all instructions to be hidden from the operator. *Hide is the highest ranked instruction level, followed by Expert and Intermediate, with Novice being the lowest ranked instruction level. Additional instruction classification levels include *All and *Actual. *All level specifies that a single instruction is used for all four instruction levels above. *Actual level specifies when an instruction override is to use the actual instruction level already assigned to the operator.

The adaptive instruction system of the illustrative embodiments provides several advantages over the existing manufacturing systems. The adaptive instruction system addresses the problem that every operator cannot be fully trained for every product condition, configuration, or situation. The adaptive instruction system also reduces the time needed to train an operator since the system automatically adjusts the work instructions provided to the operator on demand to the particular manufacturing activity required to be performed. As the work instructions provided to an operator are adjusted based on the operator's experience level for manufacturing the particular product, the adaptive instruction system allows for providing consistent and higher quality training at the point in time when the training is needed. Quality issues due to workmanship may be reduced as appropriate training is provided to each operator on demand. The adaptive instruction system further provides the ability to redeploy operators during peak production with minimal previous training, as well as support a variable or floating workforce, even in combination with an experienced workforce. When the skill level of an operator changes, the work instructions provided to the operator will subsequently be adjusted at the point of the product activity. The adaptive instruction system also allows for eliminating the concept of recertification (or at least for automating the recertification process) by allowing an operator at a production activity to obtain certification based on the operator's current activity and performance history. The adaptive instruction system also removes major inefficiencies associated with providing excess and unneeded instructions to experienced operators.

Figure 3:
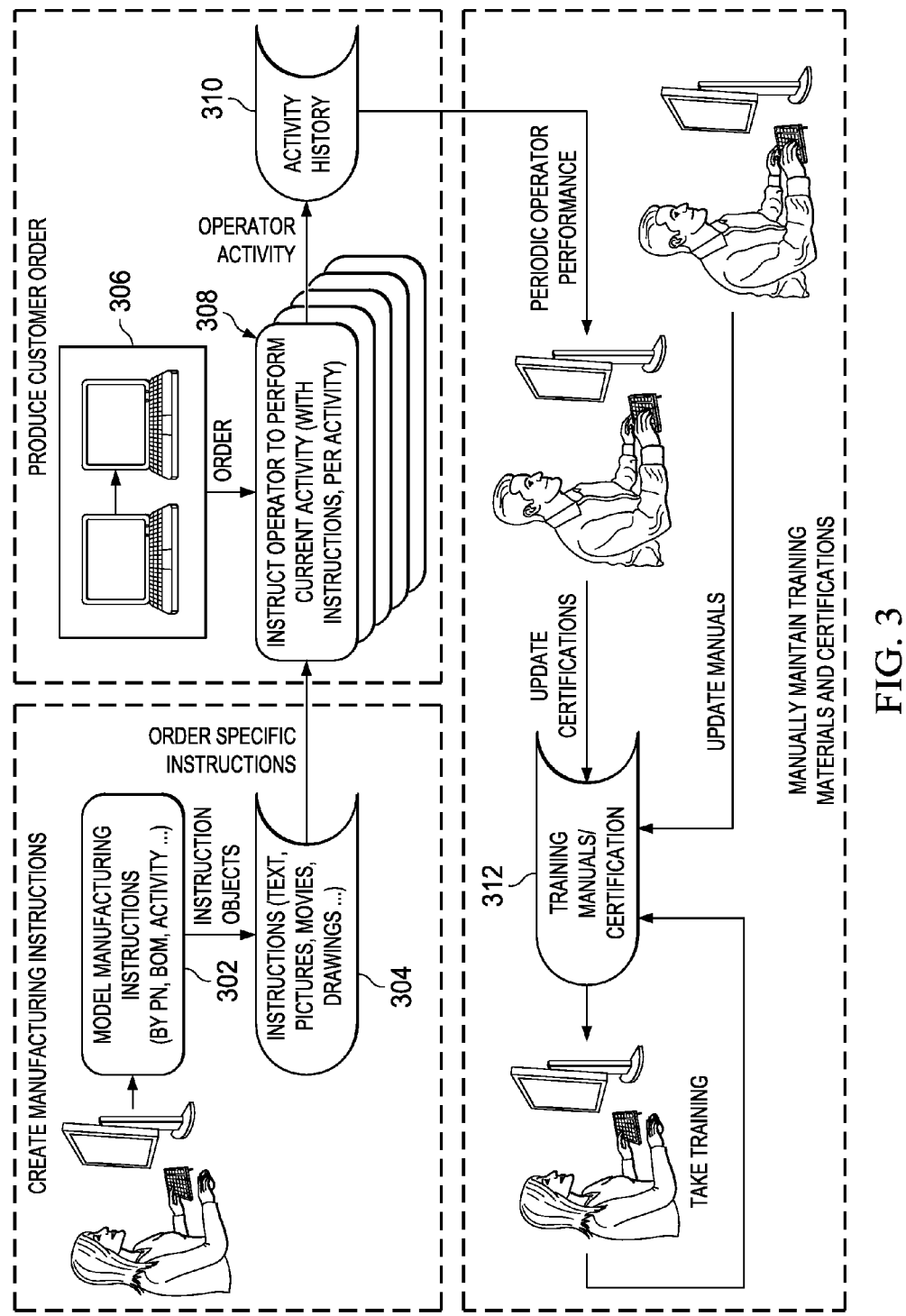
FIG. 3 is a diagram of a conventional manufacturing process.

FIG. 3 is a diagram of a conventional manufacturing system. The conventional manufacturing system may be implemented in three sections: creation of the manufacturing instructions, production of the customer order, and manual maintenance of training materials and certifications. In the first section of the conventional manufacturing process, manufacturing instructions modeled to provide guidelines on how to assemble the product are created by entering the instructions into a work instruction module in the manufacturing system (block 302). The work instructions module may be implemented in a server, such as server 104 in FIG. 1. The model manufacturing instructions may be modeled by product part number, bill of materials, production activity, etc. The created manufacturing instruction objects are then stored in a repository (block 304). The instruction objects may comprise instruction text, pictures, movies, drawings, etc.

Once the manufacturing instructions have been created, a customer order received from a client (e.g., clients 110, 112, or 114 in FIG. 1), may be produced in the second section of the conventional manufacturing system. When a request for an order is received from a customer (block 306), the manufacturing system retrieves the specific work instructions associated with the order which was stored in block 304 in the repository. The manufacturing system then provides these work instructions to an operator and instructs the operator to perform one or more production activities, the work instructions provided being based on each current activity being performed (block 308). The operator activity is recorded and stored in the repository (block 310).

The training materials and certifications are manually maintained and updated in offline processes (i.e., non-production activity processes) comprising the third section of the conventional manufacturing system (block 312). The offline processes in conventional manufacturing systems are non-adaptive. The offline processes provide static instructions based on pre-trained/pre-certified activities only and are time latent. In addition, the offline processes do not adjust as the production demands change or as the operator changes, which may increase the occurrence of manufacturing defects.

A user may periodically retrieve the operator's production activity history and compare the operator's production activity history against updates to the certifications and updates to the training manuals. If the user determines in block 308 that operator needs additional training or certification to continue to produce the customer order, the operator will receive this additional training and certification offline as required.

FIG. 4 is a diagram of an exemplary adaptive instruction system in accordance with the illustrative embodiments. Similar to the conventional manufacturing process described in FIG. 3, the adaptive instruction system creates model manufacturing instructions 402 and stores the instructions in a repository 404. The manufacturing instructions in the adaptive instruction system may include process change notifications and alters, as well as specific instructions at a task/activity level.

In contrast with the non-adaptive offline processes in conventional manufacturing systems, the self-adjusting instruction adaptation process 406 allows for providing manufacturing instructions to an operator when production activities are occurring and adjusts the level of manufacturing instructions provided to the operator as needed based on various factors. These factors may include the type of product being assembled by the operator, the parts being assembled in the product, the production environment, and the operator's current and previous production performance. The self-adjusting instruction adaptation algorithm may be used to adjust instruction levels on an order-by-order basis, a product-by-product basis, or a product part-by-product part basis. The self-adjusting instruction adaptation algorithm 406 is described in further detail in FIGS. 15A-D.

To determine the manner in which the manufacturing instructions may be adjusted, the self-adjusting instruction adaptation algorithm 406 collects and analyzes data from various sources. One data source comprises knowledge interpretation models 408 which include environmental override criteria, operator performance override criteria, and knowledge decay override criteria. The Environmental Override model, Performance Override model, and Knowledge Decay Override model are new data structures comprising instruction level override criteria. If the currently measured environmental, operator performance, and operator knowledge decay data meets the specific override criteria in these new data structures, the default level of instructions assigned to an operator performing a production activity may be adjusted to a new level of instructions. In one embodiment, the adjustment is made on a per part number or bill of materials basis.

Conventional data sources used by the self-adjusting instruction adaptation algorithm include Operator Instruction History data structure 410, Instruction Classifications data structure 412, Certification and training data structure 414, Time-phased operator performance data structure 416, and Operator quality data structure 418. Operator Instruction History data structure 410 specifies the media/instructions that have been displayed to an operator based on the product and production activity. Instruction Classifications data structure 412 specifies the particular instructions to be displayed based on the associated level of instruction assigned. Certification and training data structure 414 specify the particular certifications to qualify an operator during an operation as well as track special certifications. Time-phased operator performance data structure 416 specifies which production activities were started and completed without interruption by the same operator. Operator quality data structure 418 specifies a summary of production error records for a particular operator. A quality management system 420 may measure the operator's activities, performance, and error rates 422 and provide this data to Time-phased operator performance data structure 416 and Operator quality data structure 418.

When a customer order 424 is received, a default level of work instructions 426 is provided to the operator to perform one or more production activities. These production activities may include kitting, building, testing, and inspecting, among others. Information about the product, operator, environment, and default level of instructions is provided to the self-adjusting training instruction adaptation algorithm, which analyzes the information to determine if the default instructions to be provided to the operator should be overridden with a different level of instructions based on the override criteria specified in the knowledge interpretation models 408. If the algorithm determines the default level of instructions to be provided to the operator should be adjusted, the algorithm instructs the operator to perform the activity with the identified override instruction level for the production task/activity. The operator activity is then recorded and the information is stored in a repository 428.

Figure 5B:
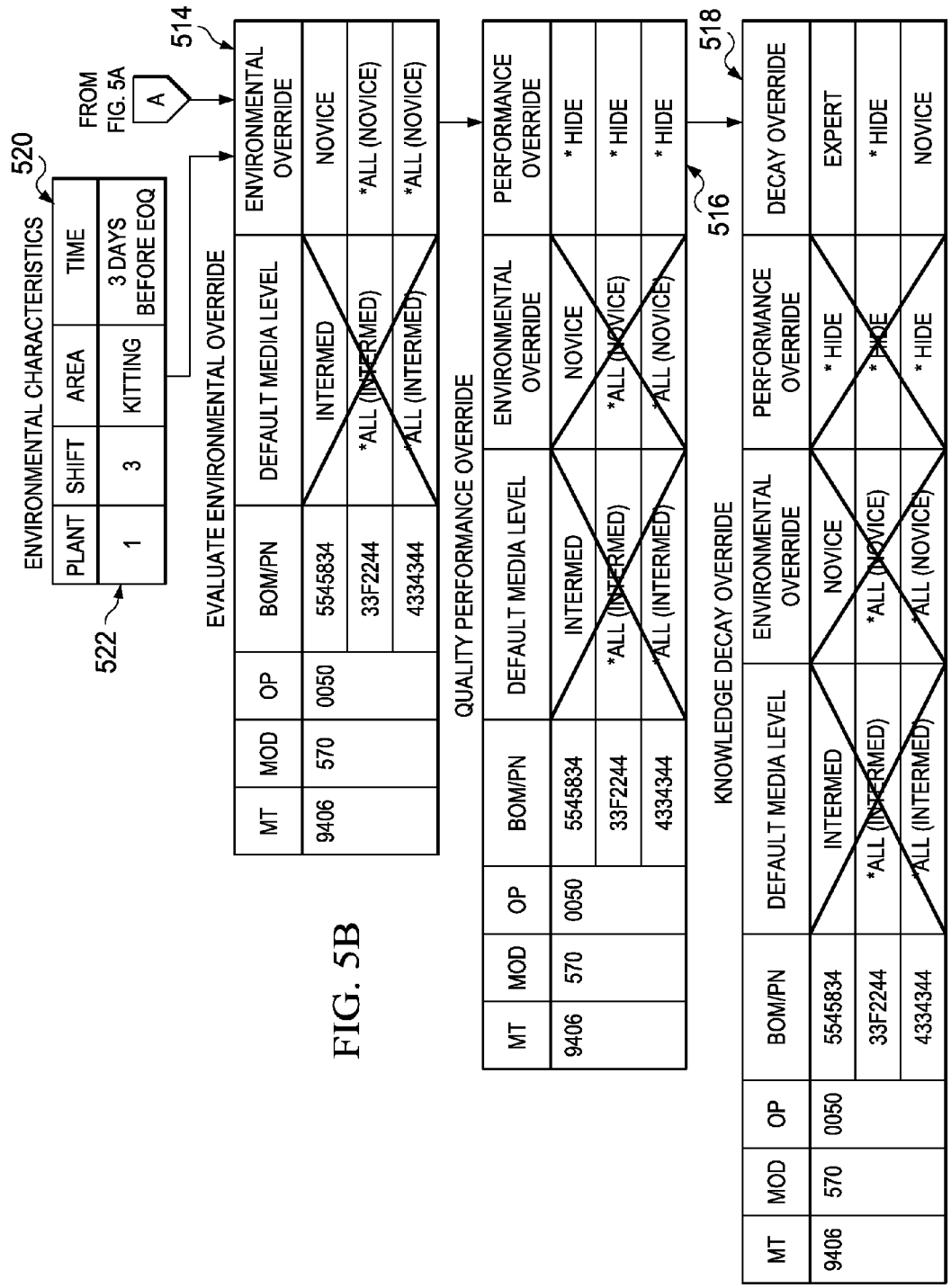
Figure 15A:
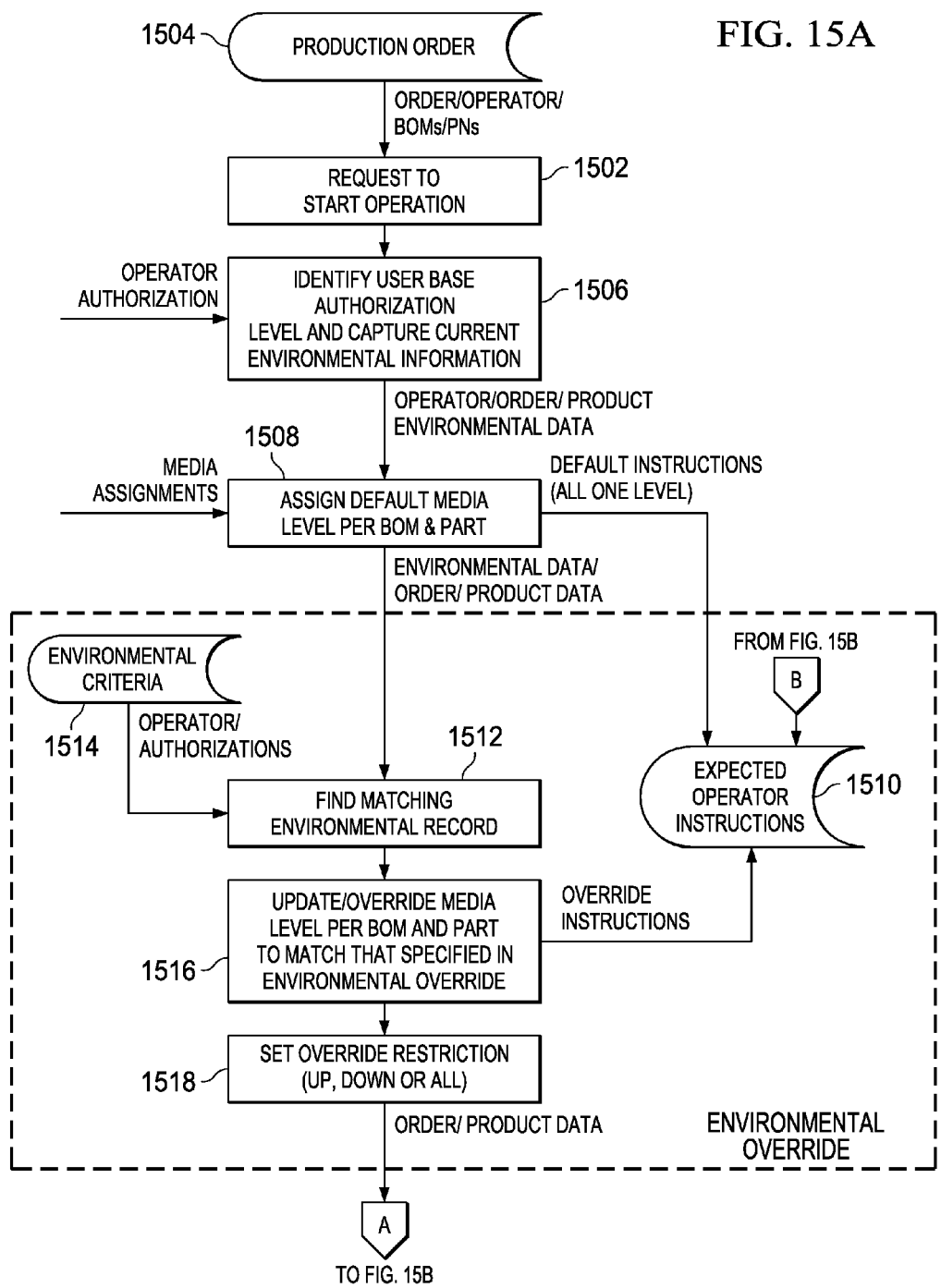
FIGS. 15A-D comprise a flowchart of a process for automatically self-adjusting the level of manufacturing instructions provided to operators on demand in accordance with the illustrative embodiments.
Figure 15B:
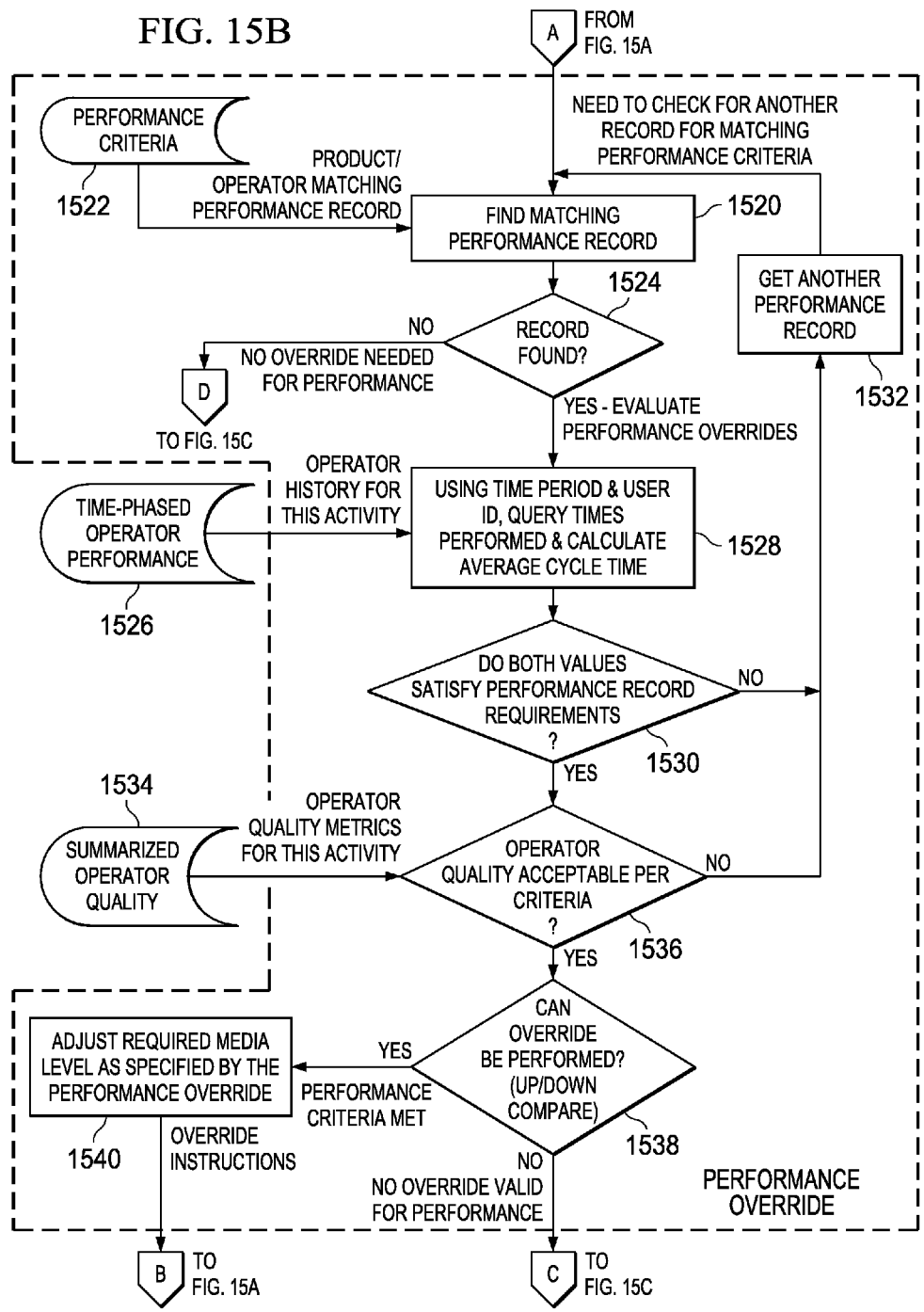
Figure 15C:
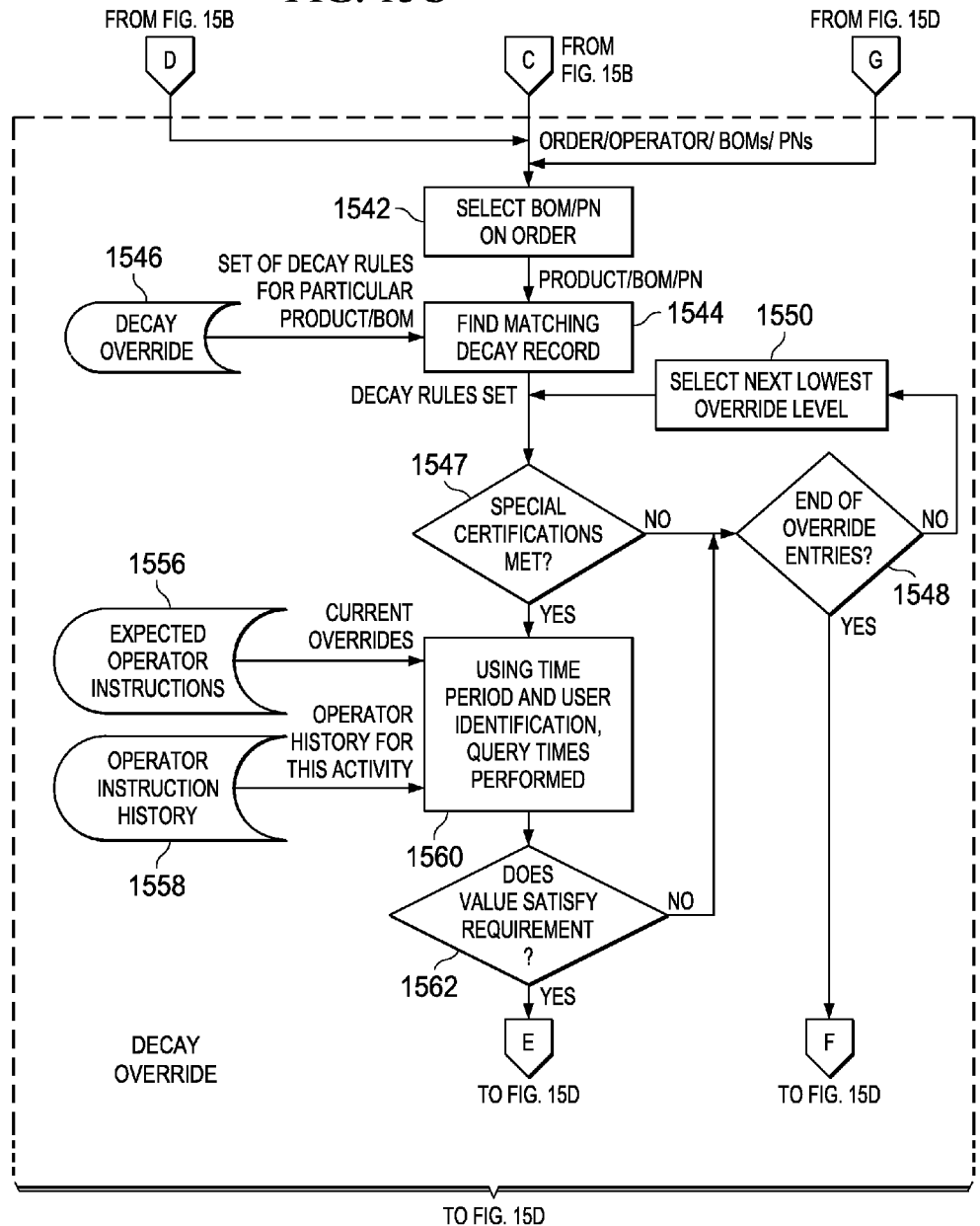
Figure 15D:
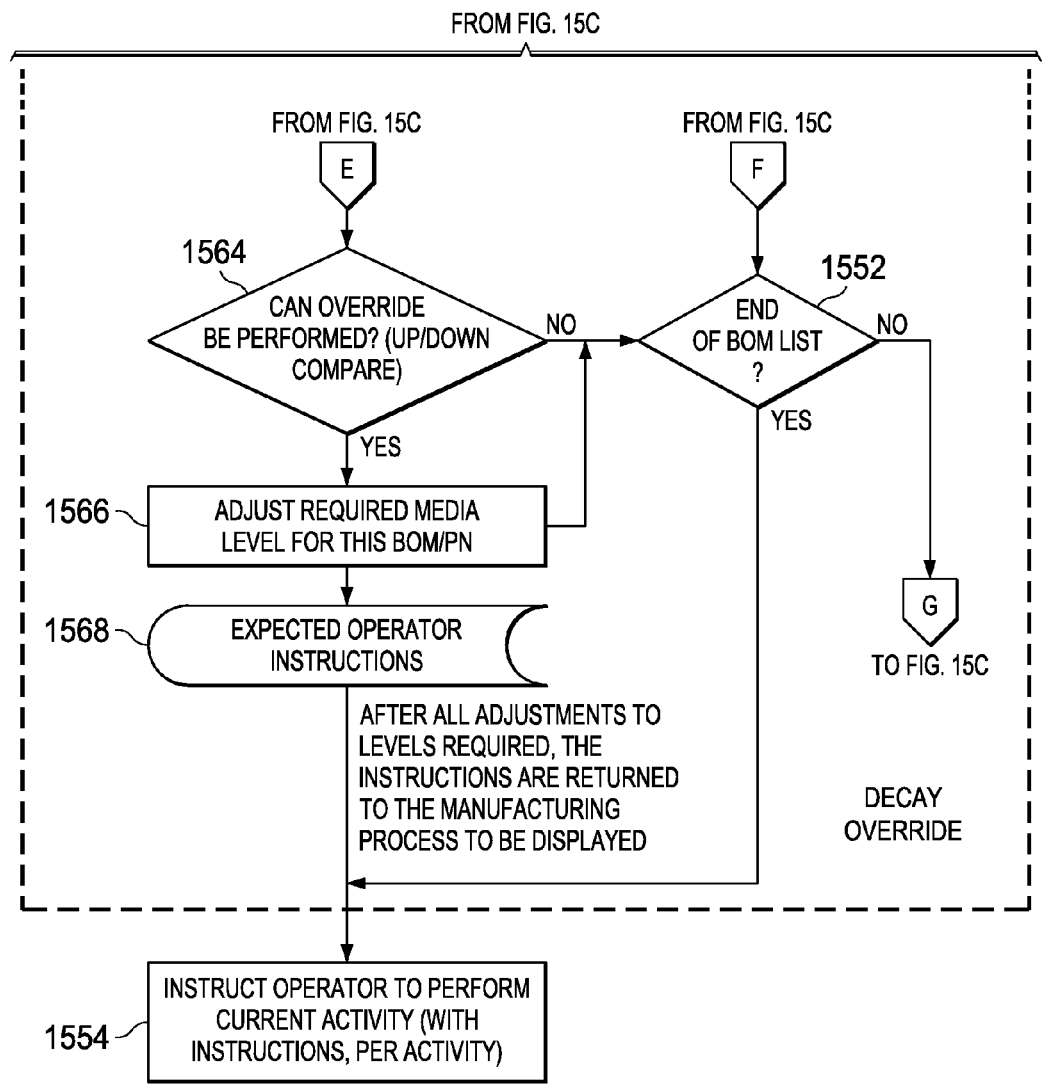

FIGS. 5A and 5B illustrate example data structures for implementing aspects of the illustrative embodiments. Data within data structures illustrated in FIGS. 5A and 5B may be analyzed by the self-adjusting instruction adaptation algorithm in block 406 in FIG. 4 to determine an appropriate level of instructions to provide to a particular manufacturing operator. The self-adjusting instruction adaptation algorithm uses data obtained from these data structures to analyze an operator's level of activity and performance history, the characteristics of the product being assembled, and production environmental issues in real-time to automatically self-adjust the level of instructions displayed to the operator at the time the production tasks and activities are occurring.

In this illustrative example, Order Characteristics data structure 502, Operator Characteristics data structure 504, and Media/Instructions data structure 506 comprise typical industry standard data structures. Order Characteristics data structure 502 defines the attributes of a customer order. As shown, record 508 in Order Characteristics data structure 502 may comprise the order number (MT) (e.g., 9406), a model number (MOD) of a model or product requested in the order (e.g., 570), the operation number (OP) of the operation or activity to be performed on the product (e.g., 0050), and the part numbers (PN) or bill of materials (BOM) for each part in the product (e.g., 5545834, 33F2244, and 4334344). Records in Order Characteristics data structure 502 may be populated upon receiving a request for the order at the manufacturing system.

Operator Characteristics data structure 504 defines the attributes of the particular operators assembling the product order specified in Order Characteristics data structure 502. As shown, record 510 in Operator Characteristics data structure 504 may comprise the user ID of the operator (e.g., ZBOB) and the particular authorization level assigned to the operator (e.g., Intermediate). Records in Operator Characteristics data structure 504 may be populated from certification and training records in an industry standard certification data model, such as from certification and training records data structure in block 414 in FIG. 4.

Media/Instructions data structure 506 defines the default media and instructions levels for each part number in the production orders specified in Order Characteristics data structure 502. As shown, record 512 in Media/Instructions data structure 506 may comprise the order number, model number, operation number, part numbers for each order, and media and instructions levels for each part numbers. The order, model, operation, and part numbers may be obtained from Order Characteristics data structure 502, and the default media and instructions levels for the operator may be obtained from Operator Characteristics data structure 504. Based on the media and instruction level specified in Media/Instructions data structure 506, the corresponding manufacturing instructions may be provided to the operator.

The self-adjusting instruction algorithm generates environmental override output 514, performance override output 516, and knowledge decay override output 518. The information in these outputs are used to determine which level of manufacturing instructions should be provided to a particular operator during production activity. The self-adjusting instruction algorithm first generates environmental override output 514 based on environmental criteria provided by Environmental Characteristics data structure 520 which defines the environment in which the order is being processed. In this example, record 522 of Environmental Characteristics data structure 520 specifies that the manufacturing process may be performed at plant 1, on the $3^{rd}$ shift, in the kitting area of the plant, and 3 days before the end of quarter. Environmental Characteristics data structure 520 may also comprise information about an order skew. An order skew occurs when orders arrive in batches that cause lots of focus in a short amount of time. Manufacturers often encounter order skew at the end of every month or end of every quarter when sales incentives are the highest.

The self-adjusting instruction algorithm analyzes the environmental criteria in Environmental Characteristics data structure 520 to determine if a product that matches the product key information in Environmental Override table 600 in FIG. 6 meets all of the environmental conditions. Environmental override output 514 illustrates that if the conditions for a product are met, the default instruction level for each part number or bill of materials for the product are adjusted to the level indicated in the matching environmental override output record.

The self-adjusting instruction algorithm then generates performance override output 516. Performance override output 516 is used to determine whether the instruction level adjusted based on the environmental override output record should be further overridden based on the performance override output 516. The self-adjusting instruction algorithm analyzes an operator's current activity and performance history to determine if the instructions to be provided to the operator for a product that matches the product key information in Performance Override table 700 in FIG. 7 should be adjusted. Performance override output 516 illustrates that if the conditions for the product are met, the environmental override instruction level for each part number or bill of materials for the product are adjusted to the level indicated in the matching performance override output record.

The self-adjusting instruction algorithm then generates knowledge decay override output 518. Knowledge decay override output 518 is used to determine whether the instruction level adjusted based on the performance override output record should be further overridden based on the knowledge decay override output 518. Knowledge decay is a time frequency in which the operator has not performed a particular activity. In other words, if the operator has not performed the operation recently or not very often, the operator's knowledge about performing the operation may have decayed or diminished. The self-adjusting instruction algorithm analyzes when and how many times an operator has performed the requested production activity to determine if the instructions to be provided to the operator for a product that matches the product key information in Knowledge Decay Override table 800 in FIG. 8 should be adjusted. Knowledge decay override output 518 illustrates that if the conditions for the product are met, the performance override instruction level for each part number or bill of materials for the product are adjusted to the level indicated in the matching knowledge decay override output record.

FIG. 6 illustrates an exemplary data structure comprising environmental criteria in accordance with the illustrative embodiments. Environmental Override table 600 provides the ability to model environmental situations at a product level to adjust (upgrade or downgrade) the level of instructions to be shown to an operator for a specific activity or task. Data from Environmental Override table 600 may be used in the self-adjusting instruction algorithm in block 406 in FIG. 4 to determine at the point of production activity whether to override the default level of instructions assigned to an operator if the specified environmental criteria is met.

In this illustrative example, Environmental Override table 600 comprises various parameters, including product key 602, plant 604, plant area 606, shift 608, time window 610, instruction override level 612, and adjust allowed parameter 614. Product key 602 indicates the product and model number of the product. Plant 604, plant area 606, shift 608, and time window 610 specify the current environmental conditions in which the product activity is performed. Instruction override level 612 indicates the level to be assigned to all of the operators unless altered by other override criteria. Adjust allowed parameter 614 is used in subsequent override algorithms and specifies whether or not future adjustments in the instruction level may be permitted either above (up) or below (down) from the currently specified environmental instruction override level 612. The record comprising the most specific product key information is listed first in the data structure, while the record comprising the least specific product key information (e.g., *All) is listed last. For a particular product that matches the product key information in a record in the data structure, the conditions specified in plant area 606, shift 608, and time window 610 must also all be TRUE. In such a case, the environmental override algorithm selects the most specific record in the data structure in which the product key, plant area, shift, and time window are TRUE and changes the instruction level for each part number or bill of materials for the specific product to the level indicated in instruction override level 612, while also allowing for further adjustment-allowed direction by other override algorithms (e.g., performance and knowledge decay) as indicated in adjust allowed parameter 614.

For instance, record 616 for product number 9406 is shown in this example as being assembled at plant 1 during shifts 2 and 3 in the kitting area. When a request for manufacturing instructions for product number 9406, model 570 is received from the kitting area at plant 1 during shifts 2 and 3 and is within the last 5 days of the end of quarter, the self-adjusting instruction algorithm will assign all operators an initial instruction level of 'Novice' based on the matching data record in the Environmental Override table 600. However, since the adjust allowed parameter has a value of 'Up', subsequent evaluations by the environmental override algorithm are allowed to further override the level assigned based on the data in Environmental Override table 600 and adjust up to a higher instruction level if the operator is qualified.

In another example, record 618 for product 9406 is shown in this example as being assembled at plant 2 during shift 2 in the kitting area. When a request for manufacturing instructions for product number 9406, model 570 is received from the kitting area at plant 1 during shift 2 and is within the last 5 days of the end of quarter, the environmental override algorithm will assign all operators a base assumption instruction level of 'Novice'. However, since the adjust allowed parameter has a value of 'Down', subsequent evaluations by the self-adjust instruction adaptation algorithm are allowed to further override the level assigned based on the matching data record in Environmental Override table 600 only if adjusting the instruction level down to a lower level. This down-only adjustment criterion may generally be implemented in situations when a trained personnel is not on-site during off-shift peak production.

Record 620 specifies that for all other non-specific products (e.g., *All) that are processed during shifts 2 and 3, no adjustment (e.g., *Actual) is made to the existing instruction level.

FIG. 7 illustrates an exemplary data structure comprising operator performance criteria in accordance with the illustrative embodiments. Performance Override table 700 provides the ability to model interpretation of performance criteria such as production quality, frequency, or cycle time. The performance criteria are used when measuring the impact of a particular operator's performance and may upgrade or downgrade the level of instructions provided to the operator. The performance criteria model may be setup for all products, a specific product, or to an operation level. Data from Performance Override table 700 may be used in the self-adjusting instruction adaptation algorithm in block 406 in FIG. 4 to determine at the point of production activity whether to override the environmental level of instructions assigned to an operator as described FIG. 6.

In this illustrative example, Performance Override table 700 comprises various parameters, including product key 702, cycle time 704, defect rate 706, and instruction override level 708. Product key 702 indicates the product, model number, and operation number of the product, although additional (e.g., part numbers) or fewer parameters may be specified within product key 702 to achieve a desired granularity level. Instruction override level 708 indicates the level to be assigned to all of the operators if the specified performance criteria is met, unless altered by other override criteria.

There are two independent measures of quality modeled in Performance Override table 700. The first measure is cycle time 704, and the second measure is actual defect rate 706. Cycle time 704 indicates the cycle time (total time required to produce a customer order), the number of times the activity has been performed by the operator, and the time period in which the operator performed the activity. Defect rate 706 indicates the error rate of the operator when performing a particular activity. The two measures are evaluated independently and may be turned on at the same time. However, if both measures are turned on, then the "match" is the result of a Boolean AND statement between the cycle time and the error rate performance. Performance Override table 700 is not applicable at a part number or bill of material level, as error rates and cycle time are generally not easily measurable at this level. The record comprising the most specific product key information is listed first in the data structure, while the record comprising the least specific product key information (e.g., *All) is listed last. For a particular product that matches the product key information in a record in the data structure, the conditions specified in cycle time 704 and defect rate 706 must also all be TRUE. In such as case, the self-adjust instruction algorithm changes the instruction level for each part number or bill of material for the specific product to the level indicated in instruction override level 708.

As shown in example record 710 for product number 9406, no cycle time is provided. If the operator working on this product has an error rate of 1%-3%, the self-adjust instruction mechanism will assume the operator is an Intermediate and adjust the instructions to an intermediate level for all part numbers and bills of material for the product. As shown in example record 712 for product number 9406, if the operator is working on operation 50 and the operator has a performance history in the last 2 weeks where the operation has been performed on average between 16-20 minutes, the self-adjust instruction mechanism will assume the operator does not need any instructions and will adjust the instruction level to hide all instructions for each part number and bill of materials for the product. As shown in example record 714 for all products in the 550 family, if the operator is performing operation 10 in less than 5 minutes, the self-adjust instruction mechanism will assume the operator is an Expert and adjust the instruction level for each part number and bill of materials for the product.

FIG. 8 illustrates an exemplary data structure comprising knowledge decay criteria in accordance with the illustrative embodiments. Knowledge Decay Override table 800 provides the ability to model knowledge decay at a product or product part level to adjust (upgrade or downgrade) the level of instructions to be shown to an operator for a specific task. This table may specify general levels using the same instruction level for all part numbers or bills of materials for a product, or may specify specific levels for any particular part number or bill of materials for the product. Data from Knowledge Decay Override table 800 may be used in the self-adjusting instruction adaptation algorithm in block 406 in FIG. 4 to determine at the point of production activity whether to override the performance criteria level of instructions assigned to an operator as described FIG. 7.

In this illustrative example, Knowledge Decay Override table 800 comprises various parameters, including product key 802, special certification 804, knowledge/decay 806, and instruction override level 808. Product key 802 indicates the product, model number, and part numbers or bills of materials of the product, although additional (e.g., operation) or fewer parameters may be specified within product key 802 to achieve a desired granularity level. Special certification 804 indicates the certification level required of the operator. Knowledge/decay 806 specifies the number of times the operator has performed the activity on the part number, as well as the period of time since the operator last performed the activity. Instruction override level 808 indicates the level to be assigned to all of the operators if the specified knowledge/decay criteria are met. The record comprising the most specific product key information is listed first in the data structure, while the record comprising the least specific product key information (e.g., *All) is listed last. Within the product key, the knowledge decay algorithm processes from the highest override level to the lowest override level. For a particular product that matches the product key information in a record in the data structure, the conditions specified in the certification 804 and knowledge/decay criteria 806 must also all be TRUE. In this case, the self-adjust instruction algorithm changes the instruction level for all or the specified part numbers or bills of materials for the product to the level indicated in instruction override level 808.

As shown in record 810, for any part number or bill of materials for product 9406, if the operator has performed the activity over 100 times in the past month and if the operator is ESD certified, the self-adjust instruction mechanism assumes the operator needs no instructions. Consequently, the self-adjust instruction mechanism will adjust the operator instruction level to hide all instructions for all part numbers and bill of materials for the product. In record 812, for any part number or bill of materials for product 9406, if the operator has performed the activity 50-99 times in the past month, the self-adjust instruction mechanism assumes the operator requires Expert instructions. Consequently, the self-adjust instruction mechanism will adjust the operator instruction level to provide Expert level instructions for all part numbers and bill of materials for the product. In record 814, for any part number or bill of materials for product 9406, if the operator has performed the activity 11-50 times in the past month, the self-adjust instruction mechanism assumes the operator requires Intermediate instructions. Consequently, the self-adjust instruction mechanism will adjust the operator instruction level to provide Intermediate level instructions for all part numbers and bill of materials for the product. In record 816, for any part number or bill of materials for product 9406, if the operator has performed the activity less than 10 times in the past 2 weeks, the self-adjust instruction mechanism assumes the operator requires Novice instructions. Consequently, the self-adjust instruction mechanism will adjust the operator instruction level to provide Novice level instructions for all part numbers and bill of materials for the product. In record 818, for the specific part number or bill of materials 33F2244 for product 9406, if the operator has performed the activity greater than 50 times in the past week, the self-adjust instruction mechanism assumes the operator requires no instructions for this specific part number or bill of materials. Consequently, the self-adjust instruction mechanism will adjust the operator instruction level to hide instructions for the particular part number or bill of materials.

FIGS. 9-13 depict exemplary conventional data structures which are used to support the environmental, performance, and knowledge decay override algorithms described above. In particular, FIG. 9 illustrates an exemplary data structure comprising operator instruction history information in accordance with the illustrative embodiments. Operator Instruction History table 900 is an example of Operator Instruction History structure 410 in FIG. 4. Operator Instruction History table 900 is used by the self-adjusting instruction mechanism to track (per user ID, product, and operation) what level of media/instructions has been displayed. As shown, a record in Operator Instruction History table 900 may specify the control number of a product, the product key comprising the machine type, the model number, and the operation number, the user ID of the operator assembling the product, the bill of material comprising the parts list of the product, and the particular level of instructions provided to the operator for assembling the product. Data within Operator Instruction History table 900 is used with the knowledge decay parameters in Knowledge Decay Override table 800 in FIG. 8 to determine how often a particular operation has been performed by the operator.

FIG. 10 illustrates an exemplary data structure comprising instruction classifications in accordance with the illustrative embodiments. Instruction Classification table 1000 is an example of Instruction Classification structure 412 in FIG. 4. Instruction Classification table 1000 is a conventional data structure used by the self-adjusting instruction mechanism to specify the particular instructions to be displayed based on the level of instruction assigned to an operator. The particular instructions to be displayed are defined based on the product key (machine type, model number, and bill of material or part number) and the level of instruction. For instance, record 1002 illustrates that for product 9406, model 570, and part number 5545834, if the operator is determined to have a Novice training level, instruction "A" will be displayed to the operator. Similarly, for the same product key, if the operator is determined to have an Intermediate training level, instruction "B" will be displayed to the operator. If the operator is determined to have an Expert training level, instruction "C" will be displayed to the operator.

FIG. 11 illustrates an exemplary data structure comprising operator certification levels in accordance with the illustrative embodiments. Operator Certification Levels table 1100 is an example of Certification and Training structure 414 in FIG. 4. Operator Certification Levels table 1100 is a conventional qualification and certification data structure used by the self-adjusting instruction mechanism to provide the ability to qualify an operator during an operation as well as track and enforce special certifications. Operator Certification Levels table 1100 may be used to determine when operators are performing activities at or below their certification level. Although the structure of Operator Certification Levels table 1100 may vary from business to business, only minimal qualification and certification information is required for the self-adjusting instruction mechanism. For instance, record 1102 for specifies that operator "ZBOB" currently has an Intermediate qualifications level with regard to product 9406, model 570, and operation 0050. With regard to all other products, models, and operations as shown in record 1104, operator ZBOB is provided with the single instruction assigned to all of the levels as ZBOB is indicated to be ESD-certified.

FIG. 12 illustrates an exemplary data structure comprising time-phased operator performance information in accordance with the illustrative embodiments. Time-Phased Operator Performance table 1200 is an example of Time-Phased Operator Performance data structure 416 in FIG. 4. Time-Phased Operator Performance table 1200 is a conventional data structure used by the self-adjusting instruction mechanism to allow for determining which operations were started and completed by the same user, without interruption. For instance, record 1202 specifies that it took operator "UDAKING" 17 minutes to perform operation 0050 on product 9406.

FIG. 13 illustrates an exemplary data structure comprising summarized operator quality information in accordance with the illustrative embodiments. Operator Quality table 1300 is an example of Operator Quality data structure 418 in FIG. 4. Operator Quality table 1300 is a conventional data structure used by the self-adjusting instruction mechanism to specify a summary of failure records of a particular operator working on a product. The failure records may be identified and verified through any known verification process. Although the particular examples defect rate and failure instances are illustrated in FIG. 13, other failure measurements may be used in Operator Quality table 1300 to specify a failure records of an operator. In this example, record 1302 shows that for product 9406, model 520, and operation 0050, user "UDAKING" has a defect rate of 1.3% with 7 total failure instances.

FIG. 14 illustrates an exemplary data structure comprising operator/instruction levels in accordance with the illustrative embodiments. Levels Definition table 1400 provides the ability to model the operator levels and define how each level ranks in order. Levels Definition table 1400 is used to provide the data setup and definitions needed to complete the self-adjusting instruction data model and support the assignments of the other data models in the system. *Hide level 1402 is assigned the highest rank and allows all instructions to be hidden from the operator. Expert level 1404 is assigned the second highest ranking and allows only the instructions which are needed (i.e., generally very few instructions) to be displayed to the operator. Intermediate level 1406 is assigned the third highest ranking and allows a balanced level of instructions between Expert and Novice levels to be displayed to the operator. Novice level 1408 is assigned the lowest rank and allows very basic (and often the most) instructions to be displayed to the operator. The Novice level is generally used to maximize the amount of instructions shown to ensure the highest quality product. Use of the Novice level instructions may slow down the operator in order to ensure the highest product quality. *All 1410 is not assigned a ranking. *All level is a named level definition that is generally used when setting up instructions and allows a single instruction to be used for all levels (1-4). Use of the *All level makes the initial setup of instructions simpler versus having to specify each level of instruction. *Actual level 1412 is not assigned a ranking. *Actual level is a named definition that is used to imply that when an override of the instruction level is intended, the actual instruction level assigned should be used instead.

FIGS. 15A-D comprise a flowchart of a process for automatically self-adjusting the level of manufacturing instructions provided to operators in accordance with the illustrative embodiments. Blocks 1502-1508 represent existing production instruction algorithms, while steps 1510-1568 represent the self-adjusting instruction adaptation algorithms in accordance with the illustrative embodiments. Within the self-adjusting instruction adaptation, blocks 1510-1518 represent the environmental override algorithm, blocks 1520-1540 represent the performance override algorithm, and blocks 1542-1568 represent the knowledge decay algorithm.

The process in the illustrative embodiments begins when a request is received to start a production activity (block 1502). This request may comprise information about order, including operation number and the bill of materials or part numbers of the product in the requested order (block 1504). The process identifies the base authorization level for the operator and captures the current environmental information, such as the plant, area, shift, etc. in which the product is being manufactured (step block 1506). The base authorization level may be obtained from certification and training data structure 1100 in FIG. 11. The operator, order, product, and environmental data is then used to assign default media/instruction levels per bill of materials or part in the product (step 1508). The default media/instruction levels may be determined from the Instructions/Classifications data structure 1000 in FIG. 10, which specify the same level of instruction for each part in the product. The instructions expected to be provided to the operator is updated with the assigned default media/instructions (comprising the same instruction level) (block 1510).

The process then initiates the environmental override algorithm by locating the environmental record that matches the captured environmental data about the production order (block 1512) from the Environmental Override data structure 600 in FIG. 6 (block 1514). Using the matching environmental record, the process updates and overrides the assigned default instruction level to match (block 1516). The assigned default instruction levels may be overridden on a part number or bill of materials level. The instructions expected to be provided to the operator is updated with the assigned environmental override instructions (block 1510). The override restriction for subsequent instruction level override algorithms as defined in the Environmental Override data structure is then set to Up, Down, or All (block 1518). A selection of Up specifies that instruction level overrides in subsequent algorithms are permitted only if the override specifies a higher instruction level, while a selection of Down is specifies that instruction level overrides in subsequent algorithms are permitted only if the override specifies a lower instruction level. A selection of All specifies that all instruction overrides in subsequent algorithms will be allowed.

Once the environmental override algorithm is completed, the process then initiates the performance override algorithm by locating the operator performance record that matches the particular product and the operation being performed (block 1520) from the Performance Override data structure 700 in FIG. 7 (block 1522). A determination is then made as to whether a matching record has been found in Performance Override data structure (block 1524). If no matching record has been found ('no' output of block 1524), the performance override algorithm is complete since no override is needed for performance, and the process continues to block 1542. If a matching record has been found ('yes' output of block 1524), the process evaluates the performance overrides by collecting the operator history for the operation from Time-Phased Operator Performance data structure 1200 in FIG. 12 (block 1526). Using the time period information and user ID information from the Time-Phased Operator Performance data structure, the process queries the number of times the operator has performed the particular activity to calculate the average cycle time for the activity (block 1528).

A determination is then made as to whether the values for the number of times the operator has performed the activity and the calculated average cycle time match a record in the Performance Override data structure (step 1530). If the values do not match a record in the Performance Override data structure ('no' output of block 1530), the process obtains another performance record in the Performance Override data structure and returns to block 1520 to check another record in the Performance Override data structure for matching performance data (block 1532). However, if the performance criteria values match a record in the Performance Override data structure ('yes' output of block 1530), the process obtains quality metrics for the operator from Summarized Operator Quality data structure 1300 in FIG. 13 (block 1534) and makes a determination as to whether the operator's performance quality for the activity is acceptable per the specified defect rate criteria in the Performance Override data structure (block 1536). If the operator's performance quality for the activity is not acceptable ('no' output of block 1536), the process obtains another performance record in the Performance Override data structure and returns to block 1520 to check another record in the Performance Override data structure for matching performance data (block 1532). However, if the operator's performance quality for the activity is acceptable ('yes' output of block 1536), the process makes a determination as to whether the instruction level override specified in the matching operator performance record based on the override restriction set in block 1518 can be performed (block 1538). If the override cannot be performed (i.e., override setting=*Actual) ('no' output of block 1538), the process continues to block 1542. However, if an override can be performed (i.e., override setting=All, Up, or Down) ('yes' output of block 1538), the assigned instruction levels from the environmental override algorithm may be overridden as specified in the matching operator performance record on a part number or bill of materials basis (block 1540). The instructions expected to be provided to the operator are updated with the assigned operator performance override instructions (block 1510), and the process also continues to block 1542.

Once the performance override algorithm is completed, at block 1542, the process initiates the knowledge decay override algorithm by selecting a particular part number or bill of material on the order. The process then locates a knowledge decay record that matches the particular product and the operation being performed (block 1544) from the Knowledge Decay Override data structure 800 in FIG. 8 (block 1546). The process obtains certification information for the operator from Certification and Training data structure 1100 in FIG. 11 and makes a determination as to whether the operator meets the special certifications specified in matching knowledge decay record (block 1547). The process may measure and keep a history of the frequency in which the operator crosses operator certification level boundaries. For instance, if an operator certified as normal builder then the operator may likely have a novice or intermediate instruction level. If the self-adjusting algorithm downgrades the operator based on the operator performance to an lower instruction level, this history may be used to determine more training or certification is required. Thus, if an operator previously certified in an area does not currently meet the same certification requirement in block 1547, the process may notify the operator that the operator requires recertification or retraining.

If the special certification for the matching knowledge decay record is not met ('no' output of block 1547), a determination is made as to whether there are any more decay records in the data structure to process (block 1548). If there are more records to process ('yes' output of block 1548), the process selects the next record with the next lowest override level (block 1550) and returns to block 1547 to check whether the special certifications in the next record is met. If there are no more records to process ('no' output of block 1548), a determination is made as to whether the end of the bill of materials has been reached (block 1552). If the end of the bill of materials has not been reached ('no' output of block 1552), the process returns to block 1542 to select another part number for processing. However, if the end of the bill of materials has been reached ('yes' output of block 1552), the process instructs the operator to perform the current activity according to the current instructions assigned to the operator for the particular activity (block 1554).

Turning back to block 1547, if the special certifications are met ('yes' output of block 1547), the process evaluates the current instruction overrides by collecting the expected operator override instructions currently assigned to the operator (block 1556) and the operator history for the operation from Operator Instruction History data structure 900 in FIG. 9 (block 1558). Using a time period which comprises the current date and time looking backwards in history to the time specified in Knowledge Decay Override table 800 in FIG. 8 and user ID information from Operator Instruction History data structure 900 in FIG. 9, the process queries the number of times the operator has performed the particular activity (block 1560). A determination is then made as to whether the number of times the operator has performed the particular activity matches the requirement specified in the matching decay record (block 1562). This determination is made by checking the requirement at a bill of materials and instruction level. If the number of times the operator has performed the particular activity does not match the decay record ('no' output of block 1562), the process continues to block 1548. However, if the number of times the operator has performed the particular activity does match the decay record ('yes' output of block 1562), the process determines whether the instruction level override specified in matching knowledge decay record based on the override restriction set in block 1518 can be performed (block 1564). If the override cannot be performed (i.e., override setting=*Actual) ('no' output of block 1564), the process returns to block 1552. However, if an override can be performed (i.e., override setting=All, Up, or Down) ('yes' output of block 1564), the assigned instruction levels from the performance override algorithm may be overridden as specified in knowledge decay record on a part number or bill of materials basis (block 1566). The instructions expected to be provided to the operator are updated with the assigned operator performance override instructions (block 1568), with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically adjusting manufacturing instructions during production activity in a manufacturing environment, the computer implemented method comprising:

responsive to receiving an order for a product, identifying an authorization level assigned to an operator performing a particular manufacturing activity on a part in the product;

assigning a default level of instructions to the operator based on the authorization level;

collecting characteristics about the manufacturing environment, performance history of the operator, and knowledge decay of the operator;

modeling the characteristics about the manufacturing environment, performance history of the operator, and knowledge decay of the operator to determine an appropriate level of instructions to provide to the operator performing the particular manufacturing activity; and providing manufacturing instructions associated with the appropriate level of instructions to the operator.

2. The computer implemented method of claim 1, wherein modeling the characteristics about the manufacturing environment further comprises:

comparing the characteristics of the manufacturing environment against a set of environmental override criteria associated with the part in the product;

responsive to a determination that the characteristics of the manufacturing environment matches the set of environmental override criteria, identifying a second level of instructions associated with the set of environmental override criteria; and automatically adjusting the manufacturing instructions assigned to the operator performing the particular manufacturing activity from the default level of instructions to the second level of instructions.

3. The computer implemented method of claim 1, wherein modeling the characteristics about the performance history of the operator further comprises:

comparing characteristics of the performance history of the operator against a set of performance history override criteria associated with the part in the product;

responsive to a determination that the characteristics of the performance history of the operator matches the set of performance history override criteria, identifying a third level of instructions associated with the set of performance history override criteria; and automatically adjusting the manufacturing instructions assigned to the operator performing the particular manufacturing activity from the second level of instructions to the third level of instructions.

4. The computer implemented method of claim 1, wherein modeling the characteristics about the knowledge decay of the operator further comprises:

comparing characteristics of the knowledge decay of an operator against a set of knowledge decay override criteria associated with the part in the product;

responsive to a determination that the characteristics of the knowledge decay of the operator matches the set of knowledge decay override criteria, identifying a fourth level of instructions associated with the set of knowledge decay override criteria; and automatically adjusting the manufacturing instructions assigned to the operator performing the particular manufacturing activity from the third level of instructions to the fourth level of instructions.

5. The computer implemented method of claim 2, wherein comparing the characteristics of the manufacturing environment against a set of environmental override criteria further comprises:

accessing an environmental override table comprising the set of environmental override criteria; and locating a record in the environmental override table that matches the manufacturing environment characteristics.

6. The computer implemented method of claim 5, wherein the set of environmental override criteria includes product key, production facility data, and order skew information.

7. The computer implemented method of claim 6, wherein the production facility data includes at least one of location, shift, language, or time window.

8. The computer implemented method of claim 5, wherein environmental override table comprises a parameter specifying one or more directions in which subsequent adjustments of the build instructions are allowed.

9. The computer implemented method of claim 3, wherein comparing the characteristics of the performance history of the operator against a set of performance history override criteria further comprises:
   accessing a performance override table comprising the set of performance history override criteria; and
   locating a record in the performance override table that matches the characteristics of the performance history of the operator.

10. The computer implemented method of claim 9, wherein the set of performance override criteria includes product key, cycle time, and product quality data.

11. The computer implemented method of claim 4, wherein comparing the characteristics of the knowledge decay of the operator against a set of knowledge decay override criteria further comprises:
   accessing a knowledge decay override table comprising the set of knowledge decay override criteria; and
   locating a record in the knowledge decay table that matches the characteristics of the knowledge decay of the operator.

12. The computer implemented method of claim 10, wherein the set of knowledge decay override criteria includes product key data and operator certification data.

13. The computer implemented method of claim 4, wherein comparing the characteristics of the knowledge decay of the operator against a set of knowledge decay override criteria further comprises:
   measuring a frequency in which the operator crosses operator certification level boundaries; and
   using the measured frequency to determine whether the operator requires retraining or recertification.

14. The computer implemented method of claim 1, wherein modeling the characteristics about the manufacturing environment, performance history of the operator, and knowledge decay of the operator is performed on an order by order basis, a product by product basis, or a product part by product part basis.

15. The computer implemented method of claim 4, wherein adjusting the level of instructions assigned to the operator comprises changing the level of instructions to one of a higher level to provide less instruction detail to the operator or a lower level to provide more instruction detail to the operator.

16. A computer program product for automatically adjusting manufacturing instructions during production activity in a manufacturing environment, the computer program product comprising:
   a computer usable medium having computer usable program code tangibly embodied thereon, the computer usable program code comprising:
   computer usable program code for identifying, in response to receiving an order for a product, an authorization level assigned to an operator performing a particular manufacturing activity on a part in the product;
   computer usable program code for assigning a default level of instructions to the operator based on the authorization level;
   computer usable program code for collecting characteristics about the manufacturing environment, performance history of the operator, and knowledge decay of the operator;
   computer usable program code for modeling the characteristics about the manufacturing environment, performance history of the operator, and knowledge decay of the operator to determine an appropriate level of instructions to provide to the operator performing a particular manufacturing activity; and
   computer usable program code for providing manufacturing instructions associated with the appropriate level of instructions to the operator.

17. The computer program product of claim 16, wherein the computer usable program code for modeling the characteristics about the manufacturing environment further comprises:
   computer usable program code for comparing the characteristics of the manufacturing environment against a set of environmental override criteria associated with the part in the product;
   computer usable program code for identifying, in response to a determination that the characteristics of the manufacturing environment matches the set of environmental override criteria, a second level of instructions associated with the set of environmental override criteria; and
   computer usable program code for automatically adjusting the manufacturing instructions assigned to the operator performing the particular manufacturing activity from the default level of instructions to the second level of instructions.

18. The computer program product of claim 16, wherein the computer usable program code for modeling the characteristics about the performance history of the operator further comprises:
   computer usable program code for comparing characteristics of the performance history of the operator against a set of performance history override criteria associated with the part in the product;
   computer usable program code for identifying, in response to a determination that the characteristics of the performance history of the operator matches the set of performance history override criteria, a third level of instructions associated with the set of performance history override criteria; and
   computer usable program code for automatically adjusting the manufacturing instructions assigned to the operator performing the particular manufacturing activity from the second level of instructions to the third level of instructions.

19. The computer program product of claim 16, wherein the computer usable program code for modeling the characteristics about the knowledge decay of the operator further comprises:
   computer usable program code for comparing characteristics of the knowledge decay of an operator against a set of knowledge decay override criteria associated with the part in the product;
   computer usable program code for identifying, in response to a determination that the characteristics of the knowledge decay of the operator matches the set of knowledge decay override criteria, a fourth level of instructions associated with the set of knowledge decay override criteria; and computer usable program code for automatically adjusting the manufacturing instructions assigned to the operator performing the particular manufacturing activity from the third level of instructions to the fourth level of instructions.

20. A data processing system for automatically adjusting manufacturing instructions during production activity in a manufacturing environment, the data processing system comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to identifying, in response to receiving an order for a product, an authorization level assigned to an operator performing a particular manufacturing activity on a part in the product; assign a default level of instructions to the operator based on the authorization level; collect characteristics about the manufacturing environment, performance history of the operator, and knowledge decay of the operator; model the characteristics about the manufacturing environment, performance history of the operator, and knowledge decay of the operator to determine an appropriate level of instructions to provide to the operator performing a particular manufacturing activity; and provide manufacturing instructions associated with the appropriate level of instructions to the operator.

* * * * *